United States Patent [19]

Xu

[11] Patent Number: 5,746,816

[45] Date of Patent: May 5, 1998

[54] LIQUID INK PROCESS AND PRINTING METHOD

[75] Inventor: Ming Xu, Mt. Pleasant, S.C.

[73] Assignee: Sawgrass Systems, Inc., Mt. Pleasant, S.C.

[21] Appl. No.: 691,699

[22] Filed: Aug. 1, 1996

[51] Int. Cl.⁶ .................................................. C09D 11/02
[52] U.S. Cl. ...................... 106/31.25; 101/488; 101/491; 347/100
[58] Field of Search ........................ 106/31.13, 31.25, 106/31.26, 31.59, 31.27; 347/100; 430/105, 137; 101/487, 488, 491; 400/120.01

[56] References Cited

U.S. PATENT DOCUMENTS

| | | | |
|---|---|---|---|
| 5,047,084 | 9/1991 | Miller et al. | 106/31.25 |
| 5,501,725 | 3/1996 | Lauw et al. | 106/31.59 |
| 5,684,063 | 11/1997 | Patel et al. | 106/31.25 |

FOREIGN PATENT DOCUMENTS

| | | | |
|---|---|---|---|
| 2-91165 | 3/1990 | Japan | 106/31.13 |

*Primary Examiner*—Ren Yan
*Attorney, Agent, or Firm*—B. Craig Killough

[57] ABSTRACT

A liquid ink is produced for practicing a method of printing the liquid ink onto a medium for subsequent thermal transfer to a substrate. Insoluble heat activated dyes, such as sublimation or dye diffusion dyes, are heated to above their melting temperature to the same phase as the solvent, which is usually water. Additives and/or stabilizers are added to form micelle particles upon cooling of the material, without separation of the insoluble components, to produce the liquid ink.

6 Claims, No Drawings

5,746,816

LIQUID INK PROCESS AND PRINTING METHOD

FIELD OF THE INVENTION

This invention relates to the production and printing of heat sensitive, dye diffusion or sublimation inks generally, and is more specifically related to a method of making a liquid heat ink for printing an image on an intermediate transfer sheet by means of ink jet printers or other printers which use liquid inks, and subsequently transferring the image by thermal means onto a substrate.

BACKGROUND OF THE INVENTION

The ink produced by the method described herein may be used to practice the printing method described in Hale, U.S. Pat. No. 5,485,614 and Hale et al., U.S. Pat. No. 5,488,907. The printing processes described in those patents is described herein as the "Hale process." Briefly, these patents describe a method of printing a sublimation, dye diffusion or heat sensitive, ink by means of an ink jet printer onto a medium, or intermediate substrate, by means of an ink jet printer which prints the ink in a liquid form. The sublimation, dye diffusion or heat sensitive dye which the ink comprises is not substantially sublimated or activated during the printing process. The printed image is transferred from the medium to a final substrate by the application of heat and pressure which sublimates or activates the ink. This transfer is achieved by low energy when compared to other sublimation or activation processes. That is, the amount of heat and pressure and the time of application of the heat and pressure is a low energy transfer when compared to prior art processes which apply heat and pressure for up to thirty minutes. To achieve one of the goals of the Hale process, it is necessary that the final transfer occur by applying heat and pressure for no more than three and one half minutes.

The dyes, or perhaps pigments, which are suitable for practicing the Hale process are dyes which are capable of transfer at low energy after printing onto the medium, and which yield an image on the final substrate which is water fast, fade resistant and which, after transfer, are no longer substantially heat sensitive. Dyes which have these characteristics are found in various classifications of dyes, including disperse dyes, solvent dyes, basic dyes, acid dyes and vat dyes. However, none of the dyes currently available which are suitable for producing a liquid ink for practicing the Hale process are soluble in water.

Accordingly, production of stable liquid inks from dyes which are not water soluble is difficult. Finely dividing the dye particles to an acceptable size for use in liquid ink formulations is difficult to achieve on an efficient level in the volumes required for commercial use. Further, the orifices or nozzles of free flow ink jet and bubble jet printers are not designed for the dispensing of solids contained within a liquid material. The orifices of these printers are typically 5-30 microns in diameter, and clogging of the orifices will occur when ink solids of relatively large particle size are transferred through the orifice, or when smaller particle sizes are transported through the orifice in large volumes.

Still further, when the ink solids are placed into the liquid, the ink solids tend to separate from the liquid over time and fall to the bottom of the ink container. The ink composition is typically sealed in a container at a manufacturing facility, for subsequent mounting of the container within the ink jet printer, meaning that a substantial storage time for the ink composition exists prior to use. Separation of the liquid and solids within the ink formulation presents problems with regard to the mechanical operation of the printer and the print quality achieved from use of the ink formulation.

In the prior art, liquid inks have been produced from dyes that have properties suitable for practicing the Hale process. However, the production of liquid inks from these dyes changes or masks the required properties, and therefore, the resulting inks cannot be satisfactorily used to practice the Hale process. For example, additives which will inhibit the dye particles from settling out of the liquid carrier, or which will inhibit agglomeration, tend to surround and insulate the dye particles, meaning that the energy required for sublimation or activation of the dye is elevated to unacceptable levels for practicing the Hale process. Other additives which are used in the prior art to produce a liquid ink from solid dyes are reactive with the dyes, and modify or eliminate required properties of the dyes. Other "side effects" of using these additives include undesired color modification or contamination, bonding with the intermediate substrate, or resulting optical density which is inadequate.

Much of the difficulty in creating liquid inks from sublimation dyes is due to the poor solubility of the dyes in viable solvents, including water, which is the most commonly used solvent for ink formulations. Finely dividing the solid dye particles and producing an emulsion, colloid or suspension with a liquid carrier and one or more additives is described in Hale et al., U.S. Pat. No. 5,488,907. However, most of the dyes which are suitable for practicing the Hale process are elastic at ambient temperatures. This elasticity makes mechanical devices normally used for finely dividing particles ineffective in decreasing the particle size of the dyes.

While solvents are available which will dissolve the dyes, the requirements of the Hale process make the use of these solvents impractical. Dye materials solubilized to the molecular level have a tendency to bond with fibers, both synthetic and natural. Accordingly, the dyes cannot be effectively transferred from a substrate used as an intermediate transfer sheet by the application of heat and pressure in the normal fashion.

Pressure and/or heat have been used to manufacture aqueous emulsions as well as aqueous colloids with particle size ranges from submicron to a few microns. Water reducible versions of wax materials and polymer materials are manufactured by this method.

SUMMARY OF THE PRESENT INVENTION

In the present invention, the water insoluble sublimation dyes are heated to above their melting temperature to the same phase as the solvent, which is usually water. Additives and/or stabilizers are added to form micelle particles upon cooling of the material, without separation of the insoluble components. This method has not heretofore been used to manufacture aqueous inks for thermal transfer process, such as ink jet inks incorporating heat activated dyes, because:

1. most sublimation disperse dyes have low decomposition temperatures which are achieved prior to their melting point;

2. under normal conditions, sublimation dyes sublimate without melting, typically at 165° C. to 250° C., and the vapor pressure of aqueous systems increases beyond that which can be reached by normal means;

3. of the unavailability of suitable dispersants or stabilizers which are effective at the elevated temperatures and pressures where sublimation disperse dyes can be emulsified into aqueous systems; and 4. filtration of sublimation/disperse dyes has been an adequate means to achieve acceptable particle size ranges, even though the usable percentage of the recovered dye is low.

Heat activated sublimation disperse dyes can be emulsified upon melting without activating or sublimating the dye by elevating the temperature and pressure of the dye in the presence of a relatively large amount of water. The temperature applied is equal to or higher than the temperature at which the dye is activated under normal conditions. Each sublimation dye has its optimum emulsifying temperature and pressure. The invention uses a pressurized system at an elevated temperature which is above the melting point of heat activated sublimation or disperse dyes to produce an aqueous emulsion with the use of a dispersant or surfactant. The advantages of this process are:

1. the process achieves superior efficiency, in that it takes substantially less time than finely dividing the dye solids by conventional milling methods, while also achieving smaller mean particle sizes;

2. the standard deviation from the mean particle size is lower than that experienced when mechanical means is used to finely divide the dye particles, which simplifies the subsequent processing which is necessary to produce the ink;

3. a higher percentage of usable dye particles, which is near 100%, as compared to mechanical means, wherein the dye is processed after finely dividing the dye, by filtering, centrifuging or otherwise separating the dye to usable particle sizes;

4. the resulting ink is much more thermally stable, since the high temperature and pressure used in generating the aqueous material, the formation and the encapsulation of the dye by the dispersant/emulsifying agent are stronger, making the resulting emulsion stable at room temperature and storage, and at the printing temperature where high temperature and pressure may be encountered; and 5. less clogging or kogation of the print head by the inks.

DESCRIPTION OF THE PREFERRED EMBODIMENT

A pressure vessel to which heat may be provided and controlled is used. The vessel may be formed of metal/alloy, and must provide substantial mechanical strength while allowing the temperature to be controlled. Metal vessels are generally superior to glass or reenforced glass, due to lower pressure tolerances and inefficient cooling properties of glass.

The emulsifying vessel is capable of maintaining a temperature which is between 100° C. and 400° C., and is capable of maintaining pressures of up to 4000 psi. The actual temperature and pressure depends upon the particular dye which is used and the ink to be produced. Typical operating temperatures for the process will be around 300° C. Typical operating pressures will be around 2000 psi. Temperature control must be accurate, with tolerances of +/−1 degree C. preferred. Rapid heating and cooling during the emulsification process is necessary to ensure precise control of the process.

The vessel should have stirring/agitating means, with a preferred stirring speed of up to 2,000 rpm. A specially designed blade with improved dispersing capability is preferred. An ultrasonic micronizer/homogenizer may be used in place of, or in combination with, the stirring system. Additionally, the vessel is preferred to have means for programming the temperature, pressure and stirring speed during the reaction, either by manual means, or automatically, as well as means for introducing the reaction component during the reaction, without materially affecting the temperature or pressure. An example of a vessel suitable for practicing the method is a high temperature/high pressure reactor vessel available from Parr Instruments Co.

The group of dyes from which dyes to be used in the method may be selected are dyes which achieve substantially complete sublimatation or activation upon the application of relatively low energy. Further, after sublimation or activation, the dyes are waterfast. The group includes only dyes which maintain these properties after formulation into an ink by the process described herein. While most of the dyes identified are disperse dyes, certain solvent dyes and/or acid dyes are included in the group. In general, the dyes which are included in the group are not reactive, and do not have strong polar function groups, such as sulfonate or carboxyl groups. The dyes which are included in the group normally have a low molecular weight which is under 600. Examples of dyes having properties which include them in the group of acceptable dyes are:

I. Disperse Dyes:

C.I. Disperse Yellow 3
C.I. Disperse Yellow 23
C.I. Disperse Yellow 7
C.I. Disperse Yellow 60
C.I. Disperse Yellow 13
C.I. Disperse Yellow 54
C.I. Disperse Yellow 61
C.I. Disperse Yellow 82
C.I. Disperse Yellow 1
C.I. Disperse Yellow 5
C.I. Disperse Yellow 42
C.I. Disperse Yellow 51
C.I. Disperse Yellow 71
C.I. Disperse Yellow 114
C.I. Disperse Yellow 141
C.I. Disperse Yellow 201
C.I. Disperse Yellow E
C.I. Disperse Yellow E-GRL
C.I. Disperse Orange 1
C.I. Disperse Orange 3
C.I. Disperse Orange 25
C.I. Disperse Red B
C.I. Disperse Red 1
C.I. Disperse Red 4
C.I. Disperse Red 17
C.I. Disperse Red 50
C.I. Disperse Red 60
C.I. Disperse Red 135
C.I. Disperse Red 167
C.I. Disperse Red 210
C.I. Disperse Violet 1
C.I. Disperse Violet 26
C.I. Disperse Blue 14
C.I. Disperse Blue 26
C.I. Disperse Blue 3
C.I. Disperse Blue 24
C.I. Disperse Blue 26
C.I. Disperse Blue 56
C.I. Solvent Blue 92
C.I. Disperse Blue 106
C.I. Disperse Violet 28
C.I. Disperse Brown 17

II. Solvent dyes:
- C.I. Solvent Red 19
- C.I. Solvent Red 111
- C.I. Solvent Red 155
- C.I. Solvent Red 143
- C.I. Solvent Orange 60
- C.I. Solvent Orange 67
- C.I. Solvent Blue 36
- C.I. Solvent Blue 63
- C.I. Solvent Blue 112
- C.I. Solvent Blue 105

III. Vat dyes:
- C.I. Vat Red 41

IV. Basic or cationic dyes, such as carbinol base dyes, for example, methene dyes:
- C.I. Basic Yellow 11
- C.I. Basic Yellow 14
- C.I. Basic Yellow 29
- C.I. Basic Yellow 51
- C.I. Basic Yellow 33
- C.I. Basic Yellow 28
- C.I. Basic Yellow 48
- C.I. Basic Orange 21
- C.I. Basic Red 12
- C.I. Basic Red 13
- C.I. Basic Red 15
- C.I. Basic Red 35
- C.I. Basic Red 52
- C.I. Basic Red 68
- C.I. Basic Violet 7
- C.I. Basic Violet 16
- C.I. Basic Violet 27
- C.I. Basic Violet 40
- C.I. Basic Blue 69

V. Diphenylmethane basic dyes or cationic dyes such as:
- Auramine (C.I. 655)

VI. Triarylmethane dyes:
- C.I. Basic Violet 1
- C.I. Basic Violet 3
- C.I. Basic Blue 1
- C.I. Basic Blue 5
- C.I. Basic Green 1
- C.I. Basic Green 4
- C.I. Basic Violet 14
- C.I. Basic Violet 10

VII. Monoazo dyes:
- C.I. Basic Orange 28
- C.I. Basic Red 23
- C.I. Basic Red 29
- C.I. Basic Violet 19
- C.I. Basic Blue 41
- C.I. Basic Blue 57

VIII. Cyanine dyes:
- C.I. Basic Red 14
- C.I. Basic Yellow 13
- C.I. Basic Yellow 66

IX. Napththostrysryl dyes:
- C.I. Basic Blue 105(S)
- C.I. Basic Blue 106(S)

X. Thiazine dyes:
- C.I. Basic Blue 9

XI. Acridine dyes:
- C.I. 46025
- C.I. 46075
- C.I. 46065
- C.I. 46045

XII. Quinoeimine dyes:
- C.I. 50040
- C.I. 51005
- C.I. 52015

XIII. Oxazine dyes:
- C.I. Basic Blue 3

XIV. Xanthene dyes:
- C.I. Basic Violet 10

XV. Other basic or cationic dyes such as anthraquinone type dyes having a quaternary amine XVI. Acid dyes
- Kayanol Milling Cyanine 5R® (Nippon Kayaku Co., Ltd.)

XVII. Direct dyes
- Direct Dark Green B® (Mitsubishi Chemical Industries, Ltd.)
- Direct Brown M® (Nippon Kayaku Co., Ltd.)
- Direct Fast Black D® (Nippon Kayaku, Ltd.)

XVIII. Certain mordant dyes and oxidizing colors.

The coloring materials listed above include the following trademarks:
- Celliton, Bafixan (BASF, A.G.)
- PTY, PTA, PTV, PTR, PTB, Diacelliton and Diaresin (Mitsubisihi Kasei, Kogyo K.K.)
- Dianix (Mitsubishi Chemical Industries, Ltd.)
- Teraprint (Ciba Geigy Corporation)
- Dianix/DyStar L.P.
- KST Black KR and Kayanol (Nippon Kayaku Co., Ltd.)
- Aizen Malachine (Hodogaya Chemical Co., Ltd.)
- Kayaset and Kayalon (Nihon Kayaku, K.K.)
- Sumiplast Sumikalon and TS (Sumitomo Kagaku, Kogyo K.K.)
- Neoplast (Shin Nihon Kasei K.K.)
- Subpraprint (Holliday)
- Sublaprint, Keytrans, Celanol, Keysperse, Keco Disperse (Keystone Aninline)
- Transferon (Sandox Company)
- Dispersol (I.C.I. Company)
- Nirusperse (Niru Corporation)
- Orcocilacron and Orcosperse (Organic Dyestuffs Corporation)
- Vynamon, Waxoline (I.C.I. Colors)
- Intrathern (Crompton & Knowles)
- Mitsui PS, Mikazol, and Miketon Polyester (Mitsui Toatsu Kagaku K.K.)
- Amasolve (American Color Company)
- Transfer (Atlantic Company)
- Plast (Arimoto Kagaku K.K.)
- Catulia (Francolor Company)
- Oplas (Orient Company)
- Hostasol (Hocchst A.G.)
- Cibacet (Ciba, Ltd.)
- and Ceres, Samaron, Resolin, Bimicron, Phorone, Macrolex, Dito, Vacsolin, Terasil, Astrazon, Kayacryl, etc.

Each heat activated sublimation dye has a different melting temperature and phase transition temperature. Accordingly, the proper temperature for processing will depend upon the dye selected. The particle size of the dye prior to processing is not limited, but it is preferred that the particles be no larger than 1 mm in diameter in order to expedite the process. In the event that the particles are larger than desired, conventional means for finely dividing the particles, such as milling, can be used prior to adding the dye to the pressure vessel.

The emulsifying enforcing agents and/or dispersants used in this invention include various dispersant materials, surfactants (cationic, anionic, amphoteric, nonionic, etc.) and polymeric surfactants, polymeric materials with dispersing ability, but which are not surfactants, can also be used. Either synthetic or natural materials can be used. The emulsifying agents, dispersants, and polymeric materials used are preferred to have a molecular weight smaller which is less than 100,000, and if possible, less than 10,000. Thermal stability of the emulsifying agent or dispersant is essential to prevent decomposition and/or chemical reaction between the emulsifying agent or dispersant and the other components in the emulsifying reaction systems. Lignosulfonate products such as Marasperse 52CP (Lignotech), Lignosol FTA (Lignotech), Lignosol SFX-65 (Lignotech), Maprasperse CBA-1 (Lignotech) Temsperse S002 (Temfibre, Inc.) Stepsperse DF series (Stephan Co.), and Weschem NA-4 (Wesco Technologies, LTD) may be used. Kraft lignin products such as Diwatex XP (Lignotech), and Reax 85 (Westvaco), and oxylignin products such as Marasperse CBOS-6 and Vanisperse CB are suitable for use as the emulsifying enforcing agent in the ink formulation of the present invention. Other examples of emulsifying agents and dispersants are alkylaryl polyether alcohol nonionic surfactants, such as Triton X series (Octylphenoxypolyethoxyethanol); alkylamine ethoxylates nonionic surfactants such as Triton FW series, Triton CF-10, and Tergitol (Union Carbide Chemicals); polysorbate products such as Tween (ICI Chemicals and Polymers); polyalkylene and polyalkylene modified surfactants, such as Silwet surfactants (polydimethylsioxane copolymers) and CoatOSil surfactants from OSI Specialties; alcohol alkoxylates nonionic surfactants, such as Renex, BRIJ, and Ukanil; Sorbitan ester products such as Span and Arlacel; alkoxylated esters/PEG products, such as Tween, Atlas, Myrj and Cirrasol surfactants from ICI Chemicals and Polymers; unsaturated alcohol products such as surfynol series surfactants from Air Products Co., alkyl phosphoric acid ester surfactant products, such as amyl acid phosphate, Chemphos TR-421; alkyl amine oxide such as Chemoxide series from Chemron Corporation; anionic sarcosinate surfactants such as Hamposyl series from Hampshire Chemical corporation; glycerol esters or polyglycol ester nonionic surfactants such Hodag series from Calgene Chemical, Alphenate (Henkel-Nopco), Solegal W (Hoechst AG), Emultex (Auschem SpA); and polyethylene glycol ether surfactants such as Newkalgen from Takemoto Oil and Fat Co.

Multiple emulsifying agents/dispersants may be used in combination to improve the emulsifying enforcing ability and to stabilize the emulsion/colloid system, as long as the components are not reactive, do not cause precipitation, or otherwise negatively impact the emulsification process.

Organic solvents, cosolvents, and/or humectants can also be introduced into the vessel during the emulsification process. However, extreme caution should be taken in handling organic solvents having low flash temperatures and/or high vapor pressures, especially those with non-polar solvents. Inert gases such as nitrogen or helium may be used to prevent sudden pressure increases, or explosions, and to prevent oxidation of the components in emulsifying system. Aliphatic and/or aromatic alcohols (thioalcohols), alkoxylated alcohols (thioalcohols), halogenated alcohols (thioalcohols) and carboxylated alcohols (thioalcohols), including mono-alcohol (thioalcohol), diol (thiodialcohol), triol (thiotrialcohol) and polyol (thiopolyalcohol), aminoxide, diamine, triamine material, may be used to improve dye/polymer solubility and stability in the final ink composition. Examples of solvent materials are diethylene glycol, DMSO and dipropylene glycol. In the production of thermal transfer inkjet ink, solvent may be added into ink subsequent to the emulsification process.

Other additives can also be introduced into the ink, such as surfactants, corrosion control agents, foam control agents, antioxidants, radiation stabilizers, thermal stabilizers, flame retarding agents, pH control agents, viscosity control agents, or surface (interfacial) tension control agents can be added during or after the emulsification process. However, strong oxidation and reduction agents should not be used, especially when an azo dye is used in the emulsification process, to prevent undesired chemical reactions, explosion and/or decomposition of the agents.

The temperature used to perform the emulsification process of the current invention depends on the particular heat activated sublimation dye which is selected, and other components used in the formulation. In general, the temperature will be above the phase transition temperature of the dye at the pressure used in the process. Since water is used as the primary solvent, the pressure used is determined by the temperature which is used, unless external, or auxiliary, pressure is added to the vessel by means of an inert gas. The inert gas may be introduced to inhibit undesired chemical reactions.

Time is material to the process, and must be carefully controlled in order to ensure: (a) proper phase transition; (b) complete melting of the dye(s); and (c) micelle formation among the dyes and other materials in the system. The typical time for the completion of the emulsification process ranges from 20 minutes to 200 minutes, depending on the particular dye, temperature, pressure, and emulsifying agent employed, as well as other conditions. Agitation must be employed in the emulsification process, either by mechanical stirring or other methods such as ultrasonic vibration.

The general formula for producing micelle ink from the emulsification process is as follows:

| Material | Weight % |
| --- | --- |
| heat sensitive dye(s) | 0.05–5% |
| dispersant/emulsifying agent | 0.05–40% |
| solvent(s)/cosolvent(s) | 0–45% |
| additive(s) | 0–20% |
| water | 40–98% |
| Total | 100% |

The resulting micelle/emulsion should have a particle size of no larger than 0.50 microns in diameter, and preferably less than 0.1 micron in diameter.

Production of a usable heat sensitive inkjet from the above micelle formulation produced by the emulsification process may require additional formulation. Additives (include dispersants, emulsifying agents, stabilizers, and/or other additives listed above) may be added by means of methods known in the art of inkjet ink manufacturing. An example of a liquid ink composition usable in an ink jet printer is as follows:

| Material | Weight % |
|---|---|
| heat sensitive dye(s) | 0.05–10% |
| dispersant/emulsifying agent | 0.05–15% |
| solvent(s)/cosolvent(s) | 0–45% |
| additive(s) | 0–15% |
| water | 40–98% |
| Total | 100% |

EXAMPLES

A suitable vessel is selected. An example of a suitable vessel, available from Parr Instrument Co., is made of T316 stainless steel, and has a capability of operating at 450° C. and 2000 psig. The vessel has cooling means with a water circulation system inside the vessel, and has a stirring speed of up to 15,000 rpm. The volume of the reactor vessel is 2500 ml in capacity. A MicroTrac UPA 150 particle size analyzer is used to evaluate the particle size. A Hewlett-Packard Deskjet 560° C. thermal inkjet printer having 300× 300 dpi resolution, an Epson Stylus Color Pro piezo electric ink jet printer with a 720 dpi resolution, and a Canon 4100 bubble-jet printer with 720 dpi resolution, are used for the printing test evaluation.

Example 1

30 grams of Spirit Blue Base (CAS# 68389-46-8) is mixed with 15 grams of Ultrazine NA (Lignotech, USA) and 500 grams of distilled water. An overhead stirrer is used to disperse the dye into the aqueous phase for approximately 10 minutes. Two (2.0) grams of Solsperse 27000 (Zenica Colors, USA) is added into the mixture, which is agitated for another 10 minutes. The mixture is then transferred into the vessel. Nitrogen gas is introduced into the mixture and the reactor for about 10 minutes to purge the vessel, and is then disconnected. The mixture is slowly heated to 195° C., with the pressure maintained at around 200 psi for 30 minutes. The maximum stirring speed for the vessel set forth above is employed. The formulation is then cooled slowly to room temperature, and the emulsion is discharged. A particle size test reveals that the mean particle size is approximately 0.12 microns for the emulsion. The printing ink for use in the ink jet printer is formulated from the emulsion as follows:

| Material | Weight % |
|---|---|
| Emulsion | 87.0 |
| Glycol | 4.0 |
| 1-methoxy-2-propanol | 7.0 |
| Ammonyx LO (1) | 2.0 |
| Total | 100% |

(1) Stepan Co

The resulting ink is printed by the HP 560 Deskjet printer onto plain copy paper in a dark cyan color, and is transferred from the paper medium or receiver onto a polyester fabric by thermal transfer at 400° F. temperature with 40 lb. pressure applied for 20 seconds.

Example 2

Twenty (20) grams of Disperse Yellow 9 (CAS# 6373-73-5) is mixed with four (4) grams of Sulfynol 131 (Air Products) and 5.0 grams of glycerol (CAS# 56-81-5) and 480 grams of distilled water. The overhead stirrer is used to disperse the dye into the aqueous phase for approximately 10 minutes. One (1.0) gram of Sulfynol 104 E (Air Products) is added to the mixture and agitated for another 10 minutes. The mixture is then transferred into the vessel. Nitrogen gas is introduced into the mixture and the vessel is purged for about 10 minutes. The mixture is slowly heated to 180° C. with the pressure maintained at around 147 psi for 40 minutes at maximum stirring speed. The formulation is slowly cooled to room temperature, and the emulsion is discharged from the vessel. A particle size test shows that the mean particle size of the emulsion is around 0.14 microns. The liquid ink for use in the ink jet printer is formulated as follows:

| Material | Weight % |
|---|---|
| Emulsion | 78.5 |
| Tergitol ™ 15-S-15 (2) | 4.0 |
| Diethylene Glycol | 8.0 |
| Thiodiethanol | 5.0 |
| 1-2-Propandiol | 4.0 |
| DEA(1) | 0.5 |
| Total | 100% |

(1) Fisher Scientific
(2) Union Carbide

The resulting liquid ink is printed by a Canon Bubble Jet 4100 printer onto plain copy paper. An intense yellow color is received by thermal transfer of the printed image from the paper to a textile at 400° F. temperature, with 40 lb. pressure for 20 seconds.

Example 3

Twenty-five (25) grams of Disperse Red 60 (CAS# 17418-58-5), mixes with twenty-two (22) grams of Transferin® N-38 (Boehme Filatex, Inc.), five (5) grams of Tergitol™ 15-S-15 (Union Carbide, USA), Ten (10) grams of 1,4-butanediol and four hundred and fifty (450) grams of de-ionized water. An homogenizer is used to disperse the solid into aqueous phase. Then the mix is then transferred into the vessel. Nitrogen gas is introduced into the mixture and the vessel to purge for approximately 10 minutes. The mixture is slowly heated to 195° C. with the pressure maintained at around 200 psi for 35 minutes with maximum stirring speed. The vessel and the mixture are then cooled to room temperature and the content of the vessel is then discharged. A mean particle size of 0.20 is obtained from the emulsion. An ink jet is formulated using the homogenized emulsion as follows:

| Component | Weight |
|---|---|
| Emulsion | 85.0 parts |
| Tergitol ™ 15-S-9(1) | 3.47 parts |
| 1-pyrrolidinone | 2.0 parts |
| 1-ethoxy-2-propanol | 6.0 parts |
| IPA | 3.0 parts |
| Kathon ® PFM(2) | 0.03 parts |
| Total | 100 parts |

(1)Union Carbid, USA
(2)Rohm & Haas Company

The resulting ink is then printed by means of an Epson Stylus Color Pro or Epson Stylus Color IIs piezo electric ink jet printer onto plain copy paper. Transfer of the image from the paper to a polyester fabric substrate is achieved by the application of heat at 400° F. for 35 seconds. The process yields a high intensity image having an optical density of 1.45 for the magenta as measured by an X-Rite 418 densitometer, with background correction.

What is claimed is:

1. A method of producing a liquid ink from solid heat activated dye, comprising:
   a. combining at least one solid heat activated dye, at least one emulsifying agent, and at least one liquid, to form a mixture;
   b. creating a micelle ink by placing said mixture in a vessel, and heating said mixture to transfer heat to said mixture, and creating and maintaining an elevated pressure within said vessel and maintaining an elevated temperature within said vessel until said dye is melted but not activated, and subsequently, rapidly cooling said mixture to form said micelle ink; and
   c. combining a liquid with said micelle ink to form a liquid ink.

2. A method of printing a design by means of a computer driven printer using heat activated dye solids, comprising the steps of:
   a. supplying a printer with a liquid ink produced by the method described in claim 1;
   c. printing said liquid ink in a desired image by means of said printer onto a medium at a temperature which is below the temperature at which the heat activated dye of said liquid ink activates; and
   d. transferring said image from said medium to an object on which the image is to appear by thermal means at a temperature which is sufficient to activate the heat activated dye, so as to cause the heat activated dye to transfer onto said object.

3. A liquid ink produced by the method of claim 1.

4. A method of producing a liquid ink from solid heat activated dye, comprising:
   a. combining at least one solid heat sensitive dye, at least one emulsifying agent, and water, to form a mixture;
   b. creating a micelle ink by placing said mixture in a vessel, and heating said mixture to transfer heat to said mixture, and creating and maintaining an elevated pressure within said vessel and maintaining an elevated temperature within said vessel until said dye is melted but not activated, and subsequently, rapidly cooling said mixture to form said micelle ink; and
   c. combining a liquid with said micelle ink to form a liquid ink.

5. A method of printing a design by means of a computer driven printer using heat activated dye solids, comprising the steps of:
   a. supplying a printer with a liquid ink produced by the method described in claim 4;
   c. printing said liquid ink in a desired image by means of said printer onto a medium at a temperature which is below the temperature at which the heat activated dye of said liquid ink activates; and
   d. transferring said image from said medium to an object on which the image is to appear by thermal means at a temperature which is sufficient to activate the heat activated dye, so as to cause the heat activated dye to transfer onto said object.

6. A liquid ink produced by the method of claim 4.

* * * * *